US012366628B2

(12) United States Patent
de Jong

(10) Patent No.: US 12,366,628 B2
(45) Date of Patent: Jul. 22, 2025

(54) UNMANNED VEHICLE ASSISTANCE FOR SUBMERGED HOST VEHICLES

(71) Applicant: The Boeing Company, Arlington, VA (US)

(72) Inventor: Michelle V. de Jong, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/182,065

(22) Filed: Mar. 10, 2023

(65) Prior Publication Data

US 2024/0302481 A1 Sep. 12, 2024

(51) Int. Cl.
| | |
|---|---|
| *G01S 5/02* | (2010.01) |
| *B64C 39/02* | (2023.01) |
| *B64U 10/60* | (2023.01) |
| *B64U 80/30* | (2023.01) |
| *B64U 80/80* | (2023.01) |
| *G05D 1/00* | (2024.01) |
| *B64U 101/55* | (2023.01) |

(52) U.S. Cl.
CPC .......... *G01S 5/0231* (2013.01); *B64C 39/024* (2013.01); *B64U 10/60* (2023.01); *B64U 80/30* (2023.01); *B64U 80/80* (2023.01); *G05D 1/101* (2013.01); *B64U 2101/55* (2023.01); *B64U 2201/104* (2023.01)

(58) Field of Classification Search
CPC ....... G01S 5/0231; B64U 80/30; B64U 10/60; B64U 80/80; B64U 2101/55; B64U 2201/104; B64C 39/024; G05D 1/101
See application file for complete search history.

(56) References Cited

U.S. PATENT DOCUMENTS

| | | | | |
|---|---|---|---|---|
| 7,296,530 | B1 * | 11/2007 | Bernstein | B63G 8/001 |
| | | | | 114/51 |
| 11,858,631 | B2 * | 1/2024 | McGrew | B64D 5/00 |
| 2016/0376000 | A1 * | 12/2016 | Kohstall | B64C 37/00 |
| | | | | 114/313 |

(Continued)

OTHER PUBLICATIONS

Vella, "Drones in the deep: new applications for maritime UAVs," ST, https://www.shiptechnology.com/features/drones-deep-new-applications-maritime-uavs/, Jan. 23, 2018, retrieved Dec. 2, 2024, 7 pages.

(Continued)

*Primary Examiner* — Thomas D Alunkal
(74) *Attorney, Agent, or Firm* — HANLEY, FLIGHT & ZIMMERMAN, LLC

(57) ABSTRACT

Methods, apparatus, systems, and articles of manufacture for unmanned vehicle assistance for submerged host vehicles are disclosed. An example apparatus includes at least one memory, machine readable instructions, and processor circuitry to at least one of instantiate or execute the machine readable instructions to determine an occurrence of a reduced operational capability of a vehicle, the vehicle at least partially submerged in a body of water, cause an unmanned vehicle (UV) to separate from the vehicle in response to the occurrence of the reduced operational capability, and determine positional information corresponding to the UV based on the UV reaching or departing a surface of the body of the water.

23 Claims, 9 Drawing Sheets

(56) References Cited

U.S. PATENT DOCUMENTS

2018/0232969 A1\* 8/2018 Florence ................. B63B 79/30
2019/0112049 A1\* 4/2019 Phan ....................... B64U 10/16
2020/0255145 A1\* 8/2020 Goddard ................ B64U 30/26
2022/0119104 A1\* 4/2022 Barnes .................... B63B 43/12

OTHER PUBLICATIONS

Abishini, A. H., et al. "Design and static structural analysis of an aerial and underwater drone." International Research Journal of Engineering and Technology 5.4 (2018), 7 pages.

\* cited by examiner though this patent document is U.S. Patent No. 12,366,628 B2.

UNMANNED VEHICLE ASSISTANCE FOR SUBMERGED HOST VEHICLES

FIELD OF THE DISCLOSURE

This disclosure relates generally to unmanned vehicles and, more particularly, to unmanned vehicle assistance for submerged host vehicles.

BACKGROUND

Unmanned vehicles (UVs) or drones are becoming more readily available and have developed into a rapidly growing market. In recent years, UVs have been utilized in a wide variety of applications including military, disaster relief, surveillance, entertainment, photography, etc. Moreover, UVs can be utilized in aerial or aquatic applications.

SUMMARY

A disclosed example apparatus includes at least one memory, machine readable instructions, and processor circuitry to at least one of instantiate or execute the machine readable instructions to determine an occurrence of a reduced operational capability of a vehicle, the vehicle at least partially submerged in a body of water, cause an unmanned vehicle (UV) to separate from the vehicle in response to the occurrence of the reduced operational capability, and determine positional information corresponding to the UV based on the UV reaching or departing a surface of the body of the water.

A disclosed example unmanned vehicle (UV) includes a battery, at least one sensor, and processor circuitry to execute instructions to in response to an occurrence of a reduced operational capability associated with a host vehicle, cause the UV to release from the host vehicle, the host vehicle at least partially submerged in a body of water, and determine a position of the UV based on information from the at least one sensor in response to the UV contacting a surface of the body of the water.

A disclosed example method includes separating, by executing instructions with at least one processor, an unmanned vehicle (UV) from a host vehicle that is at least partially submerged in a body of water based on a determination of an occurrence of a reduced operational capability of the host vehicle, and determining, by executing instructions with the at least one processor, positional information corresponding to the UV based on the UV reaching or departing a surface of the body of the water.

Figure 1:
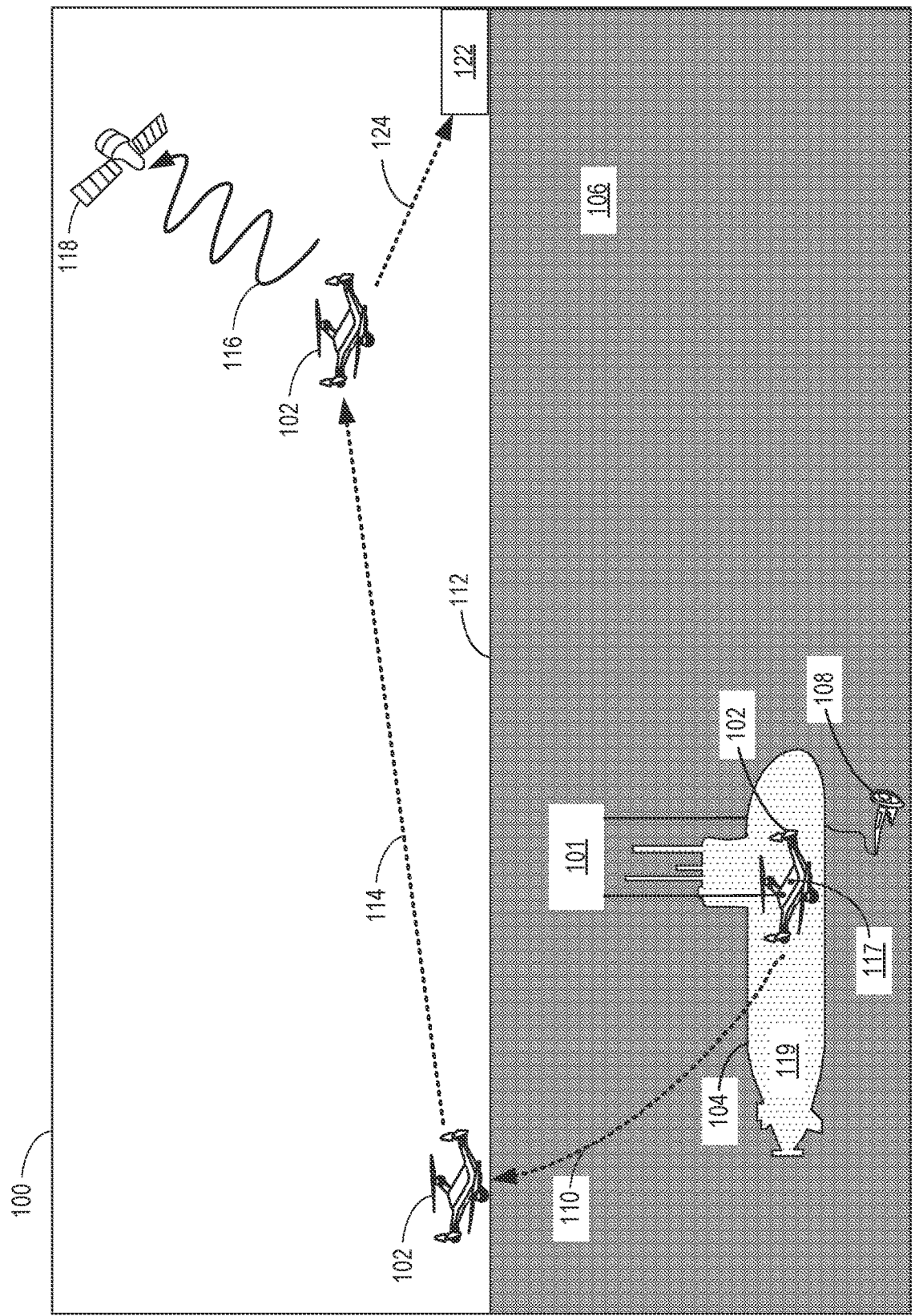
FIG. 1 illustrates example unmanned vehicle (UV) assistance in accordance with teachings of this disclosure.

In general, the same reference numbers will be used throughout the drawing(s) and accompanying written description to refer to the same or like parts. The figures are not to scale. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Unmanned vehicle (UV) assistance for submerged host vehicles are disclosed. Commonly, vehicles, such as submarines, aircraft, ships, cars, etc., utilize a position/location tracking system (e.g., Global Positioning System (GPS)). A vehicle in distress (e.g., a vehicle that has lost power, a vehicle that has been in a collision, a vehicle that is malfunctioning, etc.) may necessitate reporting of its location to facilitate recovery or assistance efforts. Further, the vehicle in distress may be located in an area in which an attempt to report its location may result in signal interception, unintended indication of its location to hostile parties and/or signal obstruction. In such examples, recovery or assistance of the vehicle in distress may be difficult or delayed without timely notification of a status of the vehicle to authorities and/or rescue teams.

Some known implementations to aid (e.g., locate, recover, etc.) vehicles utilize beacon devices (e.g., underwater beacons) to acoustically broadcast positional information. However, such devices are often highly observable and, thus, are at risk of detection in hostile waters. Thus, beacon devices may limit and/or compromise the recovery or assistance options of a vehicle in distress. Other implementations utilize strobe lights (e.g., submersible strobe lights) as a visual aid to locate a vehicle in distress. However, the ranges of such strobe lights are limited and, thus, may be ineffective at relatively large distances. For example, strobe lights may be imperceptible when viewed at a surface of the body of water from the ocean floor. Additionally, strobe lights function as mere visual aids and, thus, may not convey information pertaining to the status and/or location. As a result, strobe lights may not be effective in aiding a vehicle in distress.

Examples disclosed herein utilize a UV to assist a host vehicle (e.g., a submarine, an aircraft, a ship, etc.) submerged in a body of water that may be experiencing a malfunction, reduced operation, or other problem. In examples disclosed herein, a host vehicle can carry a UV and deploy the UV therefrom in response to a determination that the host vehicle is experiencing a reduced operational capability (e.g., a malfunction, a condition, a loss of power, an abnormal end of sortie, etc.). Once the UV is separated from the host vehicle and has reached a surface of the body of water, the UV can determine its position. Further, in examples disclosed herein, the UV can transmit and/or provide information pertaining to the host vehicle, such as a position or the aforementioned reduced operational capability of the host vehicle. The UV can move to a safe location prior to transmitting or providing (e.g., via a wired connection) confidential or sensitive information pertaining to the host vehicle. Thus, examples disclosed herein can improve the efficiency of host vehicle assistance or recovery operations by enabling access to accurate (e.g., up to date) information associated with the host vehicle. Examples disclosed herein can transmit location information (e.g., a lost location, a current location, etc.), trajectory information, and/or collision information associated with the host vehicle.

FIG. 1 illustrates an example UV assistance sequence 100 corresponding to a controller 101 that controls an example UV 102 in accordance with teachings of this disclosure. In the illustrated example of FIG. 1, an example host vehicle 104, which can be manned or un-manned, is at least partially submerged (e.g., fully submerged) in a body of water 106. In the example of FIG. 1, the host vehicle 104 is implemented as a submarine. However, the example host vehicle 104 can be a ship, an aircraft, a spacecraft, or any other type of vehicle. The example host vehicle 104 can carry, stow and/or store the UV 102. In the particular example of FIG. 1, the UV 102 is mounted to and/or releasably couplable to an external surface of a body (e.g., hull, surface, outer body, etc.) of the host vehicle 104. However, in other examples, the UV 102 can be stored within the host vehicle 104.

The example controller 101 of the host vehicle 104 determines an occurrence of an event (e.g., a reduced operational capability) associated with the host vehicle 104. For example, the controller 101 determines an occurrence of a collision of the host vehicle 104, a movement of the host vehicle 104, a location (e.g., a change of location) of the host vehicle 104, a shock/vibration of the host vehicle 104, a change in temperature and/or pressure of the host vehicle 104, a depth of the host vehicle 104 in the body of water 106, a buoyancy of the host vehicle 104, etc. In some examples, the controller 101 can monitor (e.g., track) a depth rate, rotations, and/or unexpected maneuvers associated with the host vehicle 104 via inertial sensors or accelerometers. In such examples, the controller 101 can ensure that the host vehicle 104 is travelling (e.g., ascending, descending, etc.) on the appropriate (e.g., desired) path. Further, the example controller 101 can command (e.g., instruct) the UV 102 to separate upon a depth rate failure. However, if there is no depth rate failure, the example host vehicle 104 can float (e.g., rise) to the surface 112. In some examples, vibrations of the host vehicle 104 can indicate that an engine of the host vehicle 104 has lost power. Additionally or alternatively, the controller 101 can monitor optical, acoustic, and/or magnetic signals of the host vehicle 104. In other examples, an event can indicate that the host vehicle 104 is in distress, malfunctioning, losing power from the main bus, losing communications with a main processor for a period of time, exceeding a maximum depth setting, etc.

In some examples, the host vehicle 104 can respond to reduced operational capability occurrences by floating to the surface 112, which is also referred to as "abnormal surface." In other examples, the host vehicle 104 can respond to such occurrences by contacting and/or landing at the bottom of the body of water 106 (e.g., the seafloor), which is also referred to as "bottom scuttle," mooring, scuttle operation, and/or hibernation. In such examples, information pertaining to the host vehicle 104 can be protected. Additionally or alternatively, the example host vehicle 104 can respond to such occurrences by destroying (e.g., flooding) the vehicle, which is also referred to as "destructive scuttle." In some examples, an operator (e.g., a remote operator) of the host vehicle 104 can instruct the host vehicle 104 to pursue at least one of abnormal surface, bottom scuttle, or destructive scuttle. In such examples, the controller 101 can cause the UV 102 to separate from the host vehicle 104 based on the scuttle operation (e.g., abnormal surface, bottom scuttle, destructive scuttle, etc.).

In some examples, the example UV 102 can receive communications (e.g., signals, distress signals, power loss signals, etc.) from the host vehicle 104 via a tether or wired interface (e.g., a wired interface of an umbilical cord). In some examples, deployment/actuation of an example anchor 108 or other device (e.g., strobe lights, pingers, etc.) can cause the UV 102 to separate from the host vehicle 104. In some examples, the host vehicle 104 can eject the UV 102, thereby triggering an activation of or powering on the example UV 102. In other examples, an external command or an onboard failsafe system can cause the UV 102 to separate from the host vehicle.

The example UV 102 can separate (e.g., move, detach, deploy, release, etc.) from the host vehicle 104 in response to a determination of an occurrence of an adverse event (e.g., a collision, a scuttle operation, abnormal operation, etc.). In FIG. 1, the example UV 102 can deploy in a direction as generally indicated by an arrow 110 toward a surface 112 of the body of the water 106. However, the example UV 102 can deploy in any other appropriate direction from the host vehicle 104 (e.g., directly above the host vehicle 104). Additionally or alternatively, the UV 102 can float upon release from the host vehicle 104.

Upon reaching the surface 112, the example UV 102 can move in a direction as generally indicated by an arrow 114. In other examples, the UV 102 travels and/or is propelled along the surface 112. Accordingly, the example UV 102 can include (e.g., utilize) a propulsion system (e.g., motor, propeller, wings, rotors, fins, etc.) to enable movement through air and/or the body of water 106. Additionally or alternatively, after surfacing, the UV 102 can travel to an example predetermined location 122, for example.

The example controller 101 can determine a position and/or positional information of the UV 102 when the UV reaches or departs the surface 112. The controller 101 and/or the UV 102 can store and/or cause a transmitter 117 (e.g., transceiver) of the UV 102 to transmit communications 116 (e.g., signals, messages, etc.) corresponding to the host vehicle 104. The example communications 116 can indicate a location of the host vehicle 104, a status (e.g., a status of power availability, etc.) of the host vehicle 104, a trajectory of the host vehicle 104, a last known position of the host vehicle 104, etc. Additionally or alternatively, the example communications 116 can indicate data pertaining to the occurrence (e.g., detected event) associated with the host vehicle 104. For example, the communications 116 can include at least one of a time duration of the detected event, a start time of the detected event, or a cause of the detected event.

As shown in the example of FIG. 1, the transmitter 117 can transmit the communications 116 to an example satellite 118. Additionally or alternatively, the UV 102 can convey information when recovered (e.g., via a wired connection such as a universal serial bus (USB) interface). In some other examples, the UV 102 can receive signals from a transmitter 119 of the host vehicle 104. For example, the UV 102 can receive signals from the transmitter 119 of the host vehicle 104 as the UV 102 moves away from the host vehicle 104. The signals received by the UV 102 may pertain to the occurrence encountered by the host vehicle 104 and/or a status/condition of the host vehicle 104. In some examples, the UV 102 can move in a direction as generally indicated by an arrow 124 towards a predetermined location 122 (e.g., a military base) subsequent to transmitting the communications 116. However, the UV 102 can move towards the predetermined location 122 while storing the positional information of the UV 102 and/or the host vehicle 104.

In some examples, the example controller 101 can determine a degree of separation and/or a relative distance between the host vehicle 104 and the deployed UV 102. In some examples, the controller 101 can compare the aforementioned distance between the UV 102 and the host vehicle 104 to a threshold distance. In some such examples, the threshold distance is determined based on the location of the host vehicle 104 relative to the surface 112 of the body of water 106. In other examples, the threshold distance can be determined based on the location of the host vehicle 104 relative to a range, area and/or zone of safety. For example, if the host vehicle 104 has travelled one mile into enemy territory, then the threshold distance may be at least one mile such that the UV 102 is directed (e.g., moved, deployed, etc.) out of the enemy territory.

Figure 2:
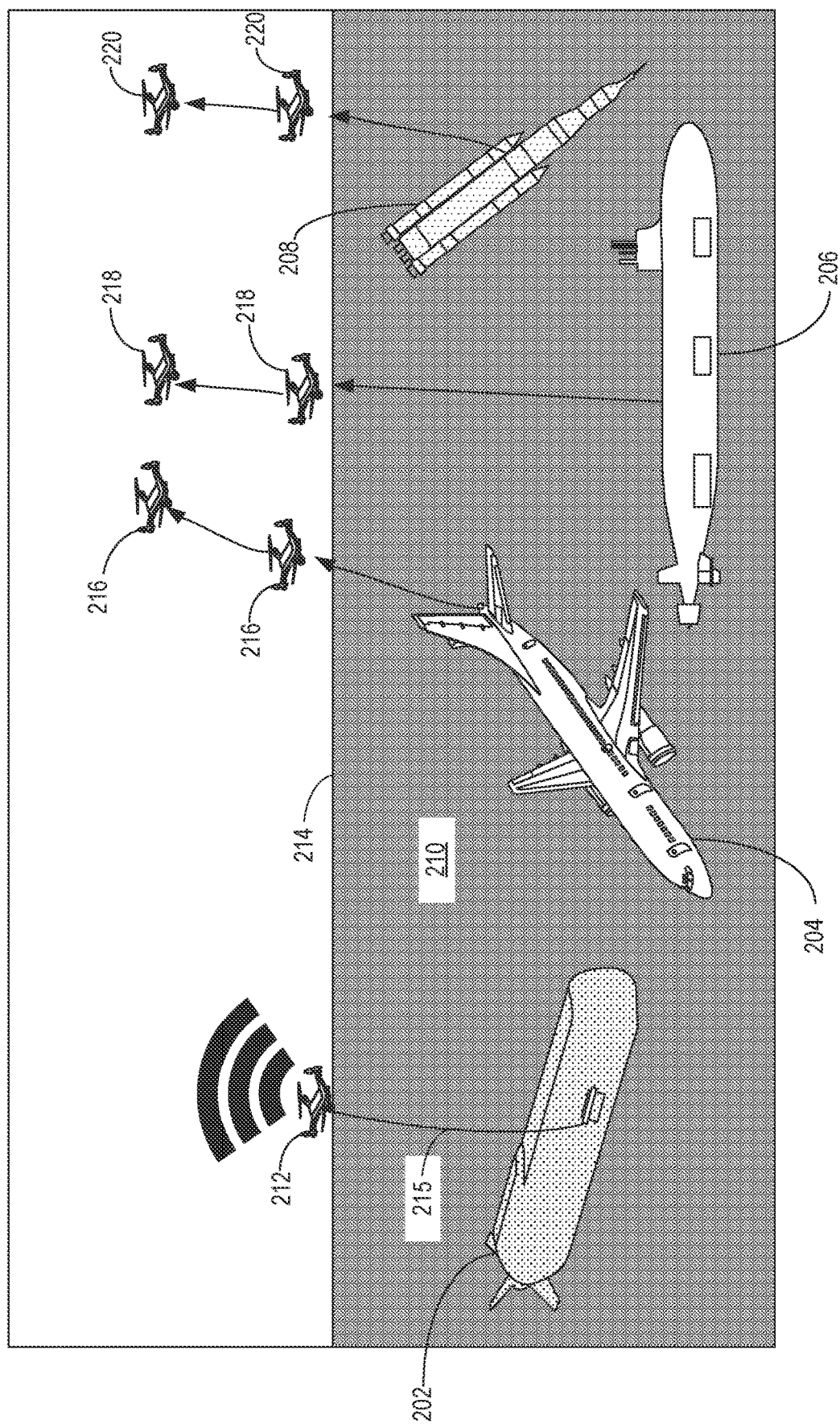
FIG. 2 illustrates an example overview of example UV assistance in accordance with teachings of this disclosure.

FIG. 2 illustrates an overview of example UV assistance operations for example host vehicles 202, 204, 206, 208 submerged in a body of water 210. In the illustrated example of FIG. 2, the host vehicles 202, 204, 206, 208 experience a reduced operational capability. The example host vehicle 202 is depicted as an underwater unmanned vehicle (UUV) that stores and/or releases an example UV 212 therefrom. The example UV 212 can determine and/or transmit positional information associated with the UV 212 based on the UV 212 reaching a surface 214 of the body of water 210. In the illustrated example of FIG. 2, the UV 212 and the host vehicle 202 are communicatively coupled via an umbilical cord or tether 215. In some examples, the UV 212 can store information pertaining to the host vehicle 202 that can be accessed/downloaded upon retrieval of the UV 212. In such examples, the UV 212 can activate an example transponder and/or an example beacon device to indicate a position of the UV 212 and/or the host vehicle 202. In some examples, the transponder and/or beacon devices can transmit a stronger signal in air than in water.

The example host vehicle 204 is depicted as an aircraft that stores and/or releases an example UV 216. The example UV 216 can determine and/or transmit a position of the host vehicle 204 or the UV 216 based on the UV 216 reaching or departing from the surface 214. The example host vehicle 206 is depicted as a submarine that stores and/or releases an example UV 218. The example UV 218 can determine its positional information based on the UV 218 reaching or departing from the surface 214. Likewise, the example host vehicle 208 is depicted as a spacecraft that stores and/or deploys an example UV 220. The example UV 220 can determine its positional information based on the UV 220 reaching or departing the surface 214.

Figure 3:
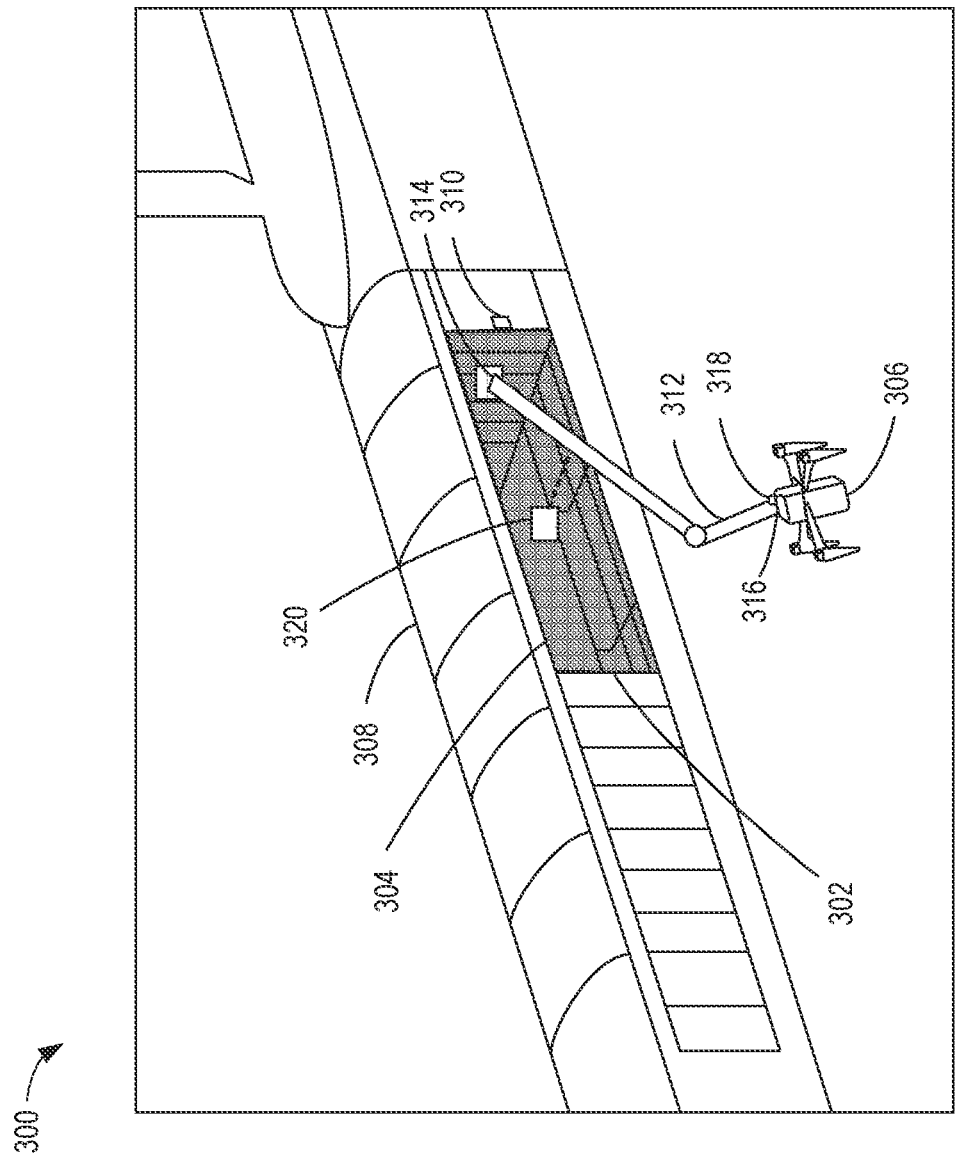
FIG. 3 is a detailed view of an example host vehicle.

FIG. 3 illustrates a portion of an example host vehicle 300 in which examples disclosed herein can be implemented. The example host vehicle 300 of FIG. 3 is similar to the example host vehicle 104 of FIG. 1, but instead includes an example door 302 and an example compartment 304 to store/stow a UV 306 (as opposed to storing the UV 306 on an external surface of the host vehicle 300). In FIG. 3, the example compartment 304 is positioned in a body 308 (e.g., a hull, fuselage, etc.) of the host vehicle 300. When the example UV 306 is deployed from the host vehicle 300, an example door lock 310 can open (e.g., automatically open) the door 302 to deploy the UV 306. Accordingly, the example door lock 310 can enable deployment of the UV 306 from the host vehicle 300. In some such examples, opening the door 302 causes the UV 306 to float out of the compartment 304.

The example host vehicle 300 further includes an example arm 312 (e.g., an umbilical cord) that releasably couples the UV 306 to the host vehicle 300 and provides data communication therebetween. In the illustrated example of FIG. 3, the arm 312 is movable, rotatable, pivotable and/or extendable (e.g., retractable) from the body 308. For example, the arm 312 includes a first end 314 mounted to the body 308 and a second end 316 detachably/releasably coupled to (e.g., detachable from) the UV 306 via a lock interface (e.g., a release, a release mechanism, a release interface, etc.) 318. In some examples, the first end 314 is mounted to an inner surface of the compartment 304. Additionally or alternatively, when the example UV 306 is released from the host vehicle 300, the example door lock 310 can open the door 302 for deployment/release of the UV 306 via the lock interface 318, which can include or be associated with a lock. In particular, the example lock interface 318 enables release/deployment of the UV 306 attached to the arm 312 and/or the host vehicle 300. Further, in some examples, an example lock 320 can enable the arm 312 to swing away from the body 308 with the UV 306 attached thereto. As mentioned above, the example arm 312 can be utilized to transfer (e.g., transmit) data to the host vehicle 300 prior to detaching the UV 306 therefrom and/or the data (e.g., instructions) can cause the UV 306 to separate from the host vehicle 300.

Figure 4:
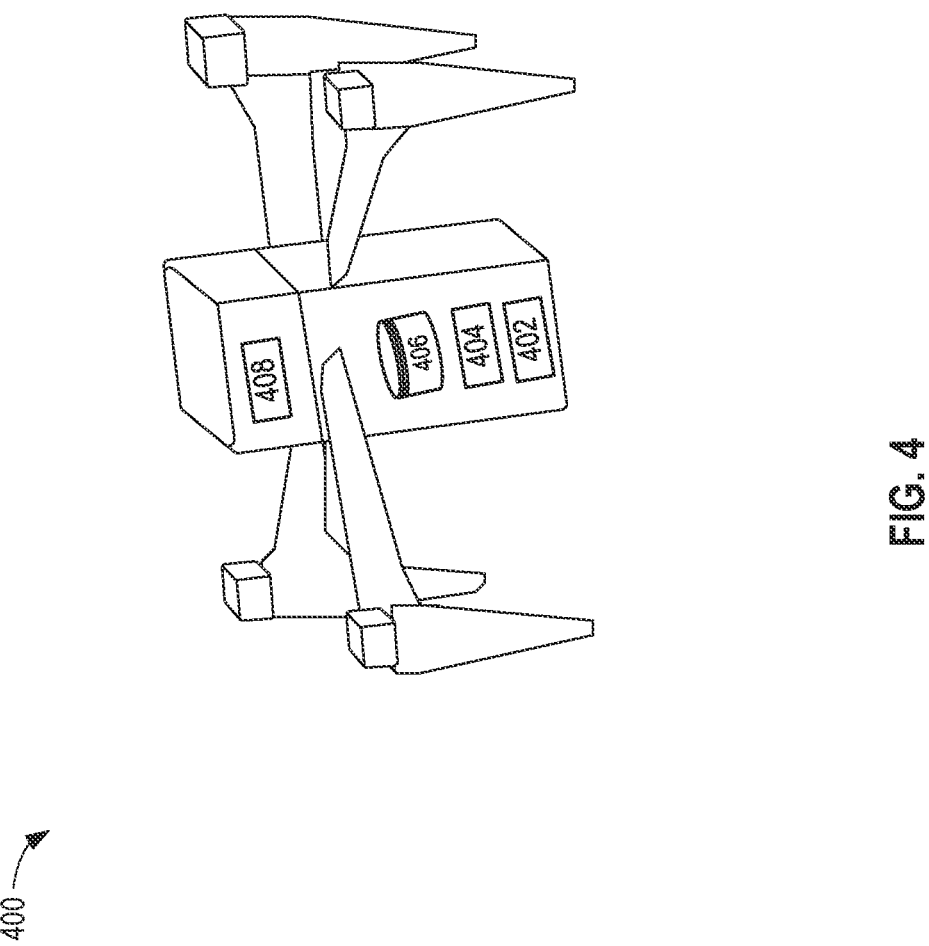
FIG. 4 is an example UV in which examples disclosed herein can be implemented.

FIG. 4 illustrates an example UV 400 in which examples disclosed herein can be implemented. The example UV 400 includes an example data bus (e.g., a data bus interface) 402, an example GPS receiver 404, an example memory storage 406, and an example sensor 408. The example sensor 408 can detect/monitor at least one of an acceleration, an inertia, a shock, a vibration, a temperature, and/or a pressure of the UV 400. In other examples, the sensor 408 can be an optical sensor, an acoustic sensor, and/or a magnetic sensor. However, any other appropriate sensor type can be implemented instead. Thus, the example UV 400 contains on-board detection mechanisms (e.g., the sensor 408) for initiating operational/release phases of the UV 400. In some examples, data (e.g., temperature of the UV 400, pressure of the UV 400, acceleration of the UV 400, etc.) can transfer through the example arm 312 and/or the umbilical cord 215 to at least the data bus 402. In such examples, the UV 400 is provided with data from example host vehicles prior to separation. However, the example UV 400 can also independently assess a state-of-health associated with an example host vehicle based on the type of vehicle and mission. In such examples, two-way communication between the example host vehicle and the UV 400 is disabled. Further, the example GPS receiver can determine and/or transmit positional information of the UV 400. Additionally or alternatively, the example memory storage 406 can store data and/or positional information of the UV 400.

The example UV 400 can be a submersible drone capable of traveling through air and/or water. As such, the example UV 400 can include motors, propellers, fins, etc. In some examples, the UV 400 can float. Further, the example UV 400 is rugged, self-contained, waterproof, etc. In some examples, the UV 400 has a limited life and, as such, includes a battery for power supply. The example UV 400 may be capable of withstanding a water depth of 20,000 feet. In some examples, the UV 400 can include, but not limited to, materials such as acrylonitrile butadiene styrene (ABS), poly methyl methacrylate (PMMA), polyethylene terephthalate glycol (PETG), polylactic acid (PLA), EOS aluminum—AlSi10Mg, etc. In some examples, weights associated with components of the UV 400 can range from 0.10 kilograms (kgs)-0.60 kgs, for example. In some examples, the UV 400 can include cameras, strobe lights, pingers, etc.

Figure 5:
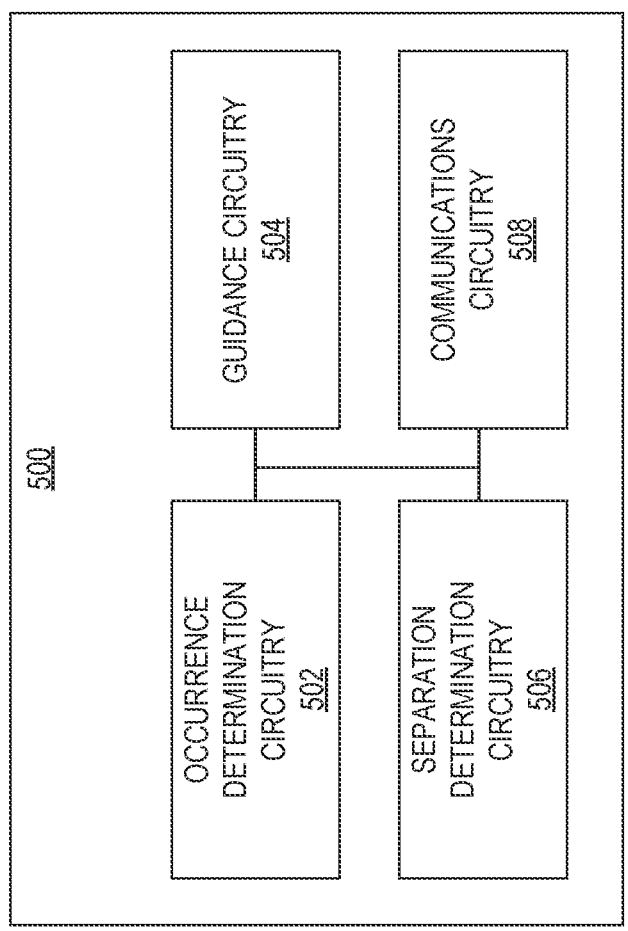
FIG. 5 is a block diagram of example UV assistance circuitry in accordance with teachings of this disclosure.

FIG. 5 is a block diagram of example UV assistance circuitry 500 to direct an example UV (e.g., the UV 102, the UV 212, the UV 216, the UV 218, the UV 220, the UV 306, the UV 400, etc.) to convey information when a submerged host vehicle has reduced operational capabilities and/or is disabled. The example UV assistance circuitry 500 of FIG. 5 may be instantiated (e.g., creating an instance of, bring into being for any length of time, materialize, implement, etc.) by processor circuitry such as a central processing unit executing instructions. Additionally or alternatively, the example UV assistance circuitry 500 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers.

The example UV assistance circuitry 500 includes example occurrence determination circuitry 502, example guidance circuitry 504, example separation determination circuitry 506, and example communications circuitry 508. The example UV assistance circuitry 500 can be implemented by any of the example UVs 102, 212, 216, 218, 220, 306, 400 and/or the controller 101.

The example occurrence determination circuitry 502 determines (e.g., detects, identifies, etc.) an occurrence of a reduced operational capability (e.g., a disabling, damage, etc.) associated with a host vehicle (e.g., the host vehicle 104, the host vehicle 202, the host vehicle 204, the host vehicle 206, the host vehicle 208, the host vehicle 300, etc.). For example, the occurrence determination circuitry 502 determines an occurrence of a collision of the host vehicle 104, a movement of the host vehicle 104, a location (e.g., a change of location) of the host vehicle 104, a shock/vibration of the host vehicle 104, a change in temperature and/or pressure of the host vehicle 104, a depth of the host vehicle 104 in the body of water 106, a rate of change of the depth of the host vehicle 104, a buoyancy of the host vehicle 104, etc. In some examples, the occurrence determination circuitry 502 can monitor (e.g., track) a depth rate, rotations, and/or unexpected maneuvers associated with the host vehicle 104 via inertial sensors or accelerometers. In such examples, the occurrence determination circuitry 502 can ensure that the host vehicle 104 is travelling (e.g., ascending, descending, etc.) on the appropriate (e.g., desired) path. In some examples, the occurrence determination circuitry 502 can detect vibrations of the host vehicle 104 which can indicate that an engine of the host vehicle 104 has lost power. Additionally or alternatively, the occurrence determination circuitry 502 can monitor optical, acoustic, and/or magnetic signals of the host vehicle 104. In other examples, the example occurrence determination circuitry 502 can determine whether the host vehicle 104 is in distress, malfunctioning, losing power from the main bus, losing communications with a main processor for a period of time, exceeding a maximum depth setting, etc. In some examples, the occurrence determination circuitry 502 is instantiated by processor circuitry executing occurrence determination instructions and/or configured to perform operations such as those represented by the flowchart of FIG. 6.

The example guidance circuitry 504 causes separation, release and/or deployment of the UV 102 from the host vehicle 104. For example, the guidance circuitry 504 can cause an example lock interface to release and/or separate the UV 102 from the host vehicle 104 based on the occurrence of the reduced operational capability. Additionally or alternatively, the guidance circuitry 504 can cause deployment of the UV 102 along the surface 112 of the body of water 106. In some examples, the guidance circuitry 504 is operatively coupled to an example lock (e.g., the door lock 310, the lock interface 318, the lock 320, etc.). For example, the guidance circuitry 504 can cause the door lock 310 to release the UV 306 from the compartment 304 by opening the door 302 such that the UV 306 is enabled to float out of and/or maneuver away from the host vehicle 300. Additionally or alternatively, the guidance circuitry 504 executes instructions to cause the arm 312 to swing away from the body 308 with the UV 306 attached thereto. In turn, the example guidance circuitry 504 releases the UV 306 from the second end 316 via release of the lock interface 318 and/or the lock 320 to cause the UV 102 to separate from the host vehicle 104. In some examples, the guidance circuitry 504 is instantiated by processor circuitry executing guidance instructions and/or configured to perform operations such as those represented by the flowchart of FIG. 6.

In some examples, the separation determination circuitry 506 determines a distance and/or degree of separation between the UV 102 and the host vehicle 104. According to some such examples, the separation determination circuitry 506 can monitor (e.g., determine) a position of the UV 102. In this example, the separation determination circuitry 506 compares the distance between the UV 102 and the host vehicle 104 to a threshold distance to determine whether the UV 102 is separated from the host vehicle 104 by at least the example threshold distance. In other words, the example separation determination circuitry 506 determines whether a distance between the UV 102 and the host vehicle 104 meets or exceeds an example threshold distance (e.g., one mile, two miles, etc.). In some examples, the separation determination circuitry 506 determines a position (e.g., positional information) of the UV 102 based on the UV 102 reaching or departing from the surface 112 of the body of water 106. In some examples, the separation determination circuitry 506 is instantiated by processor circuitry executing separation determination instructions and/or configured to perform operations such as those represented by the flowchart of FIG. 6.

The example communications circuitry 508 transmits the communications 116 associated with the host vehicle 104 from the UV 102. In particular, the example communications circuitry 508 causes the transmitter 117 to transmit the communications 116 associated with the host vehicle 104 based on a position of the UV 102 relative to the host vehicle 104 (e.g., the UV 102 has surfaced). The communications 116 can include a determined position of the UV 102 subsequent to reaching a surface.

In some examples, the communications circuitry 508 can cause transmission of communications that indicate a location of the UV 102, a location of the host vehicle 104, a condition/status of the host vehicle 104, and/or a trajectory of the host vehicle 104. Additionally or alternatively, the communications circuitry 508 can transmit data pertaining to the occurrence encountered by the host vehicle 104. For example, the communications circuitry 508 transmits the communications 116 that include at least one of a time duration of the occurrence, a start time of the occurrence, or a cause of the occurrence. The example communications circuitry 508 can transmit the communications 116 to the satellite 118. In some examples, the communications circuitry 508 is communicatively coupled to the transmitter 117 (or transceiver), such that the communications circuitry 508 can transmit the communications 116 via the transmitter 117. In some other examples, the communications circuitry 508 can receive signals from the host vehicle 104 and/or the satellite 118. For example, the communications circuitry 508 can receive signals and/or data from the host vehicle 104 when the UV 102 is positioned and/or moves between the host vehicle 104 and the example threshold distance. In other examples, the communications circuitry 508 can store data pertaining to the UV 102 and/or the host vehicle 104. In some examples, the communications circuitry 508 is instantiated by processor circuitry executing communications instructions and/or configured to perform operations such as those represented by the flowchart of FIG. 6.

While an example manner of implementing the UV assistance circuitry 500 is illustrated in FIG. 5, one or more of the elements, processes, and/or devices illustrated in FIG. 5 may be combined, divided, re-arranged, omitted, eliminated, and/or implemented in any other way. Further, the example occurrence determination circuitry 502, the example guidance circuitry 504, the example separation determination circuitry 506, the example communications circuitry 508, and/or, more generally, the example UV assistance circuitry 500 of FIG. 5, may be implemented by hardware alone or by hardware in combination with software and/or firmware. Thus, for example, any of the example occurrence determination circuitry 502, the example guidance circuitry 504, the example separation determination circuitry 506, the example communications circuitry 508 and/or, more generally, the example UV assistance circuitry 500, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example UV assistance circuitry 500 may include one or more elements, processes, and/or devices in addition to, or instead of, those illustrated in FIG. 5, and/or may include more than one of any or all of the illustrated elements, processes and devices.

Figure 6:
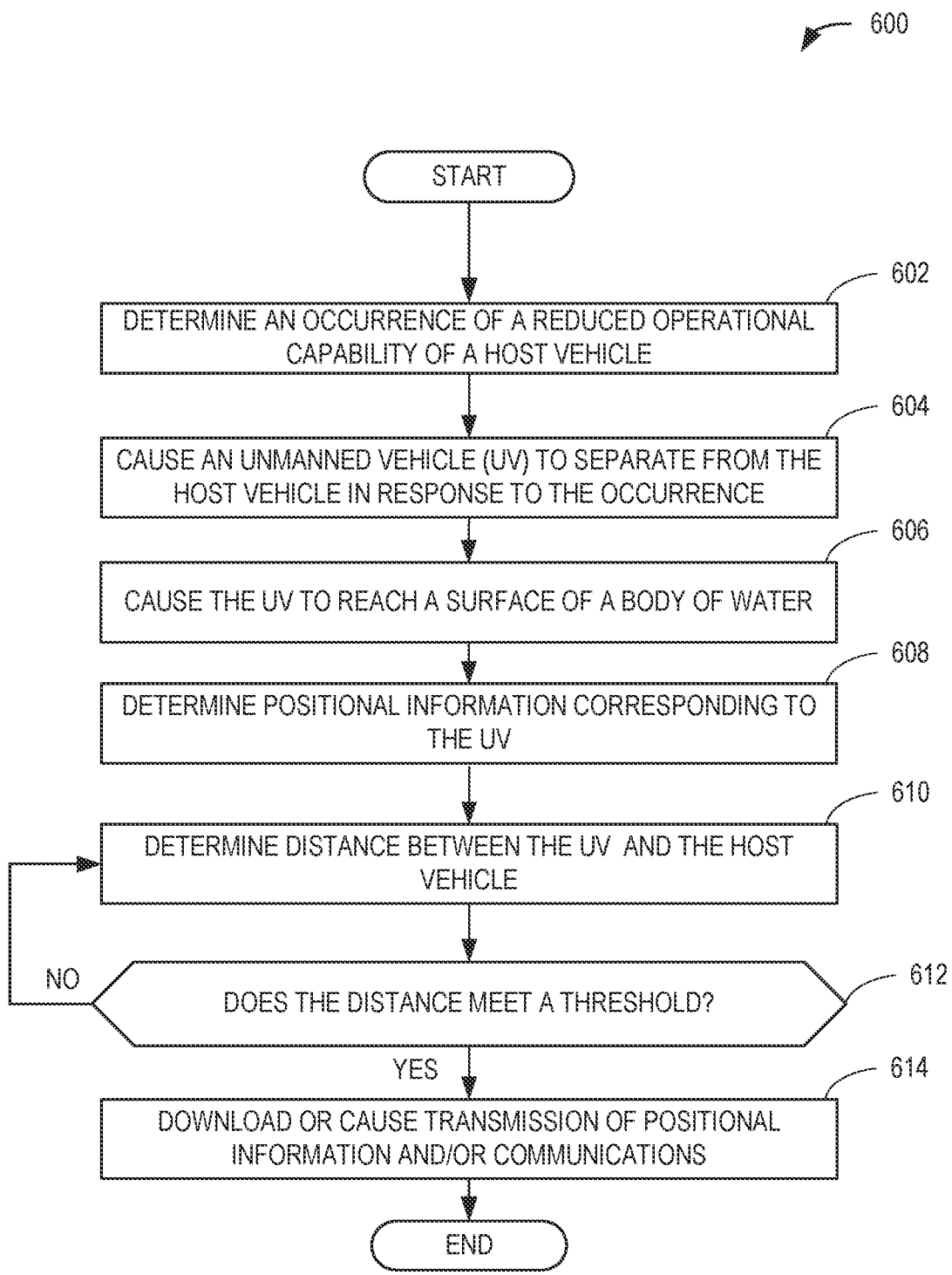
FIG. 6 is a flowchart representative of example machine readable instructions and/or example operations that may be executed by example processor circuitry to implement the example UV assistance circuitry of FIG. 5.

A flowchart representative of example machine readable instructions, which may be executed to configure processor circuitry to implement the UV assistance circuitry 500 of FIG. 5, is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example UV assistance circuitry 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to control the example UV 102. The machine readable instructions and/or the operations 600 of FIG. 6 begin at block 602, at which the example occurrence determination circuitry 502 detects and/or determines an occurrence of a reduced operational capability of the host vehicle 104. In some examples, the occurrence determination circuitry 502 determines an occurrence of at least one of a power loss of the host vehicle 104, a scuttle operation of the host vehicle 104, rapid change in depth of the host vehicle 104, a scuttle operation of the host vehicle, a collision of the host vehicle 104, unexpected movements of the host vehicle 104, or a rapid change in position of the host vehicle 104, etc. Additionally or alternatively, the occurrence determination circuitry 502 determines that the host vehicle 104 is in distress, malfunctioning, experiencing a power loss, etc.

At block 604, the example guidance circuitry 504 causes separation and/or release of the UV 102 from the host vehicle 104 based on the occurrence of the reduced operational capability. In this example, the UV 102 is released from an external surface of the host vehicle 104. In some other examples, the guidance circuitry 504 controls an example lock (e.g., the door lock 310, the lock 320, the lock interface 318, etc.). For example, the guidance circuitry 504 can cause release of the UV 306 from the compartment 304 by controlling the door lock 310. In such examples, opening the door 302 can enable the UV 306 to float out of the compartment 304.

At block 606, the example guidance circuitry 504 causes the UV 102 to move toward the surface 112 of the body of water 106. In some examples, the example guidance circuitry 504 causes the UV 102 to maneuver to the surface 112. Additionally or alternatively, the UV 102 floats to the surface 112.

At block 608, the example separation determination circuitry 506 determines positional information corresponding to the UV 102 (e.g., a position of the UV 102) based on the UV 102 reaching or departing the surface 112 of the body of water 106. In some particular examples, the UV 102 utilizes GPS signals upon reaching or departing from the surface 112. In some examples, the separation determination circuitry 506 determines a position of the UV 102 based on a GPS receiver.

At block 610, in some examples, the separation determination circuitry 506 determines, calculates and/or monitors a distance between the UV 102 and the host vehicle 104. In some examples, the UV 102 receives communications and/or information corresponding to the condition of the UV 102 as the UV 102 separates from the host vehicle 104.

At block 612, in some examples, the example separation determination circuitry 506 determines whether the distance between the UV 102 and the host vehicle 104 meets a threshold distance. For example, the threshold distance can be determined based on the location of the host vehicle 104 relative to a range and/or zone of safety.

For example, if the distance between the UV 102 and the host vehicle 104 is one mile and the example threshold distance is two miles, the example separation determination circuitry 506 determines that the distance does not satisfy or meet the threshold distance. As such, the example process returns to block 610. In other examples, when the distance between the UV 102 and the host vehicle 104 is three miles and the example threshold distance is two miles, the example separation determination circuitry 506 determines that the distance satisfies the threshold distance and proceeds to block 614.

At block 614, the example communications circuitry 508 enables download and/or transmits communications/information associated with the host vehicle 104 and/or the UV 102 (e.g., to a satellite or communications associated with another receiver) and the process ends. In some examples, the communications circuitry 508 can store information pertaining to the host vehicle 104 (e.g., a position of the UV 102 upon surfacing from the host vehicle 104) that can be accessed/downloaded upon retrieval of the UV 102. In such examples, the communications circuitry 508 can activate an example transponder and/or an example beacon device to indicate a position of the UV 102 and/or the host vehicle 104. In some examples, the communications circuitry 508 transmits the communications associated with the host vehicle 104 based the UV 102 being at a pre-defined designated rendezvous point. In some examples, the communications are encrypted and/or scrambled.

Figure 7:
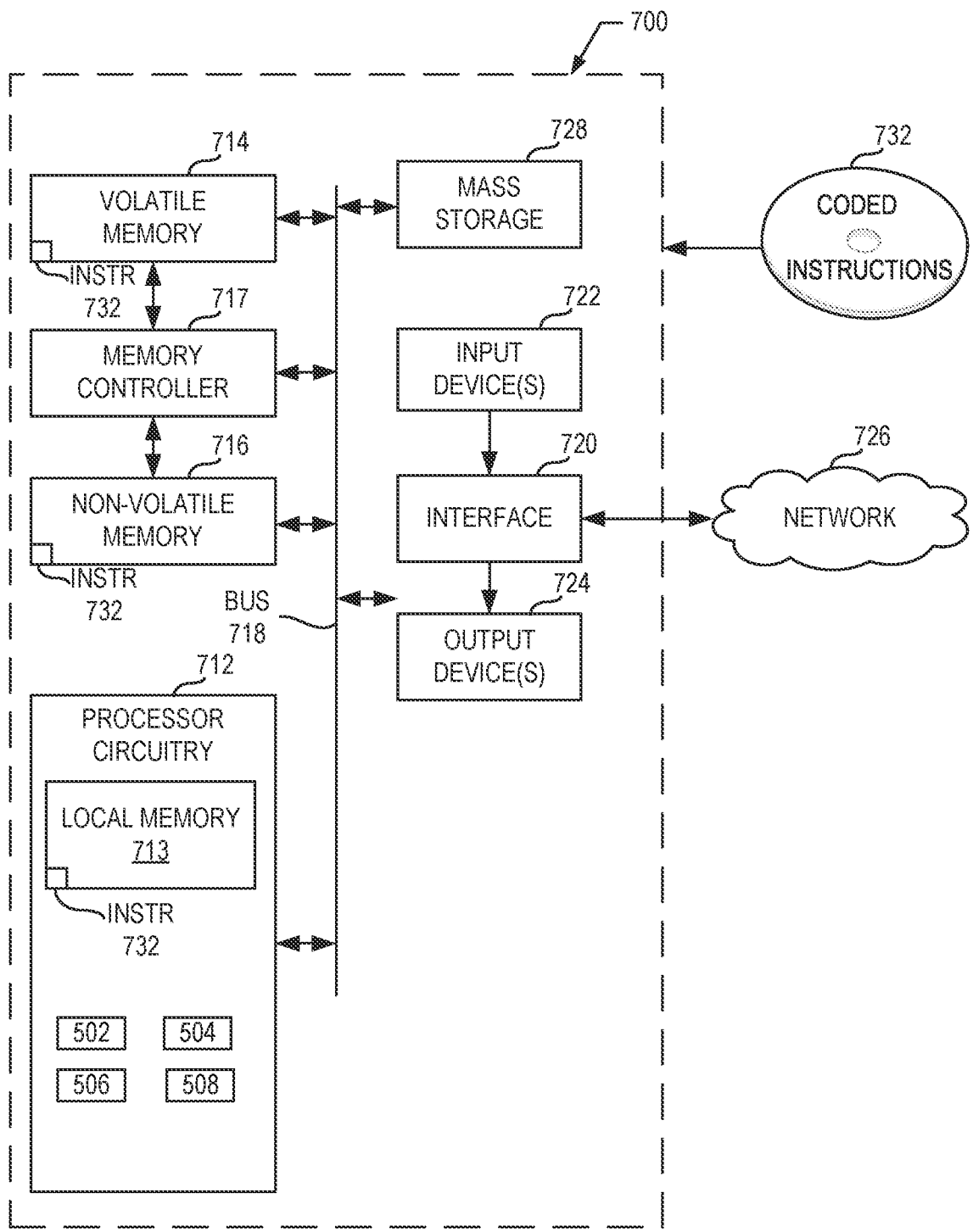
FIG. 7 is a block diagram of an example processing platform including processor circuitry structured to execute the example machine readable instructions and/or the example operations of FIG. 6 to implement the example UV assistance circuitry of FIG. 5.

FIG. 7 is a block diagram of an example processor platform 700 structured to execute and/or instantiate the machine readable instructions and/or the operations of FIG. 6 to implement the example UV assistance circuitry 500 of FIG. 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example occurrence determination circuitry 502, the example guidance circuitry 504, the example separation determination circuitry 506, and the example communications circuitry 508.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 6 may be stored in the mass storage device 728, in the volatile memory 714, in the non-volatile memory 716, and/or on a removable non-transitory computer readable storage medium such as a CD or DVD.

Figure 8:
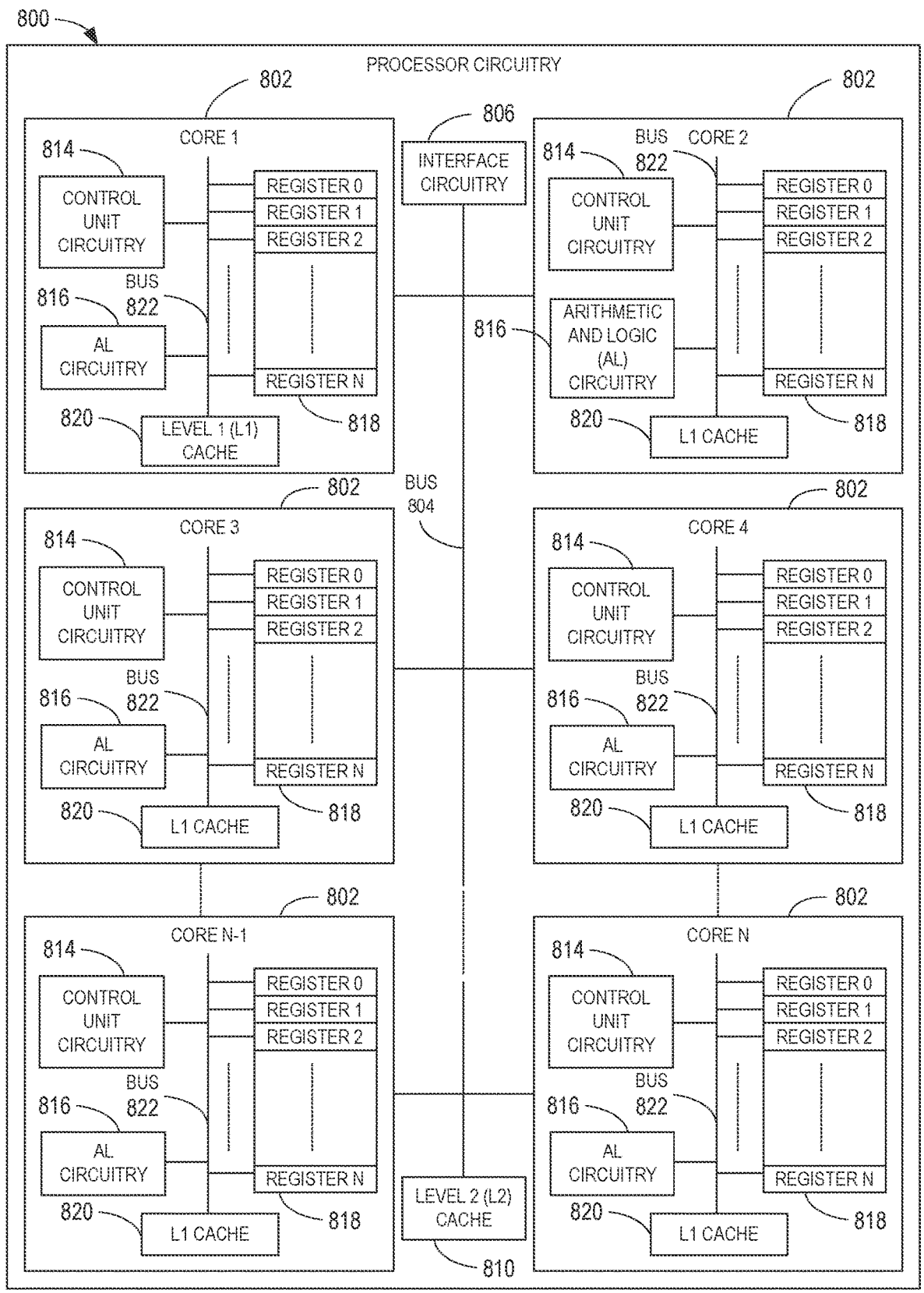
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIG. 6 to effectively instantiate the example UV assistance circuitry 500 as logic circuits to perform the operations corresponding to those machine readable instructions. In some such examples, the example UV assistance circuitry 500 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2) cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
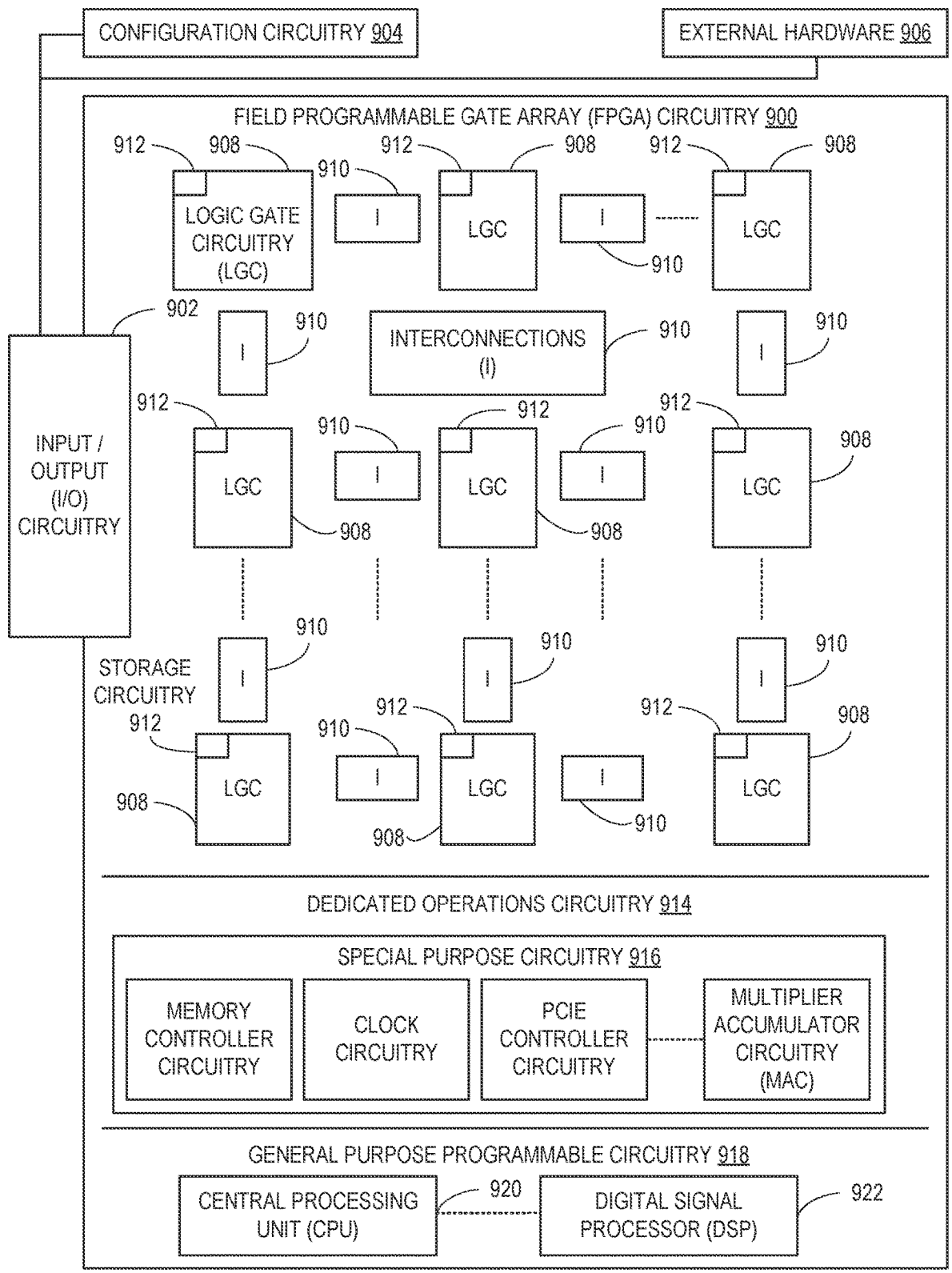
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8, a second portion of the machine readable instructions represented by the flowchart of FIG. 6 may be executed by the FPGA circuitry 900 of FIG. 9, and/or a third portion of the machine readable instructions represented by the flowchart of FIG. 6 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that enable assistance of a host vehicle carrying a UV. Examples disclosed herein utilize a UV to store and/or transmit confidential and/or sensitive information pertaining to the host vehicle when the UV separates from the host vehicle. Examples disclosed herein enable access to positional information of the UV and/or the host vehicle. Disclosed systems, methods, apparatus, and articles of manufacture improve the efficiency of using a computing device by improving the efficiency of host vehicle assistance operations by providing more accurate information associated with the UV and/or host vehicle and, thus, reducing computations that would be otherwise necessary to locate the UV and/or the host vehicle. Disclosed systems, methods, apparatus, and articles of manufacture are accordingly directed to one or more improvement(s) in the operation of a machine such as a computer or other electronic and/or mechanical device.

Example 1 includes an apparatus comprising at least one memory, machine readable instructions, and processor circuitry to at least one of instantiate or execute the machine readable instructions to determine an occurrence of a reduced operational capability of a vehicle, the vehicle at least partially submerged in a body of water, cause an unmanned vehicle (UV) to separate from the vehicle in response to the occurrence of the reduced operational capability, and determine positional information corresponding to the UV based on the UV reaching or departing a surface of the body of the water.

Example 2 includes the apparatus of example 1, wherein the processor circuitry is to execute the instructions to determine that the UV is separated from the vehicle by a distance that meets or exceeds a threshold distance, and in response to determining that the distance meets or exceeds the threshold distance, transmit, via a transmitter of the UV, communications including information associated with the vehicle.

Example 3 includes the apparatus of example 1, wherein the UV is releasably couplable to an outer body of the vehicle.

Example 4 includes the apparatus of example 1, wherein the reduced operational capability is at least one of a power loss, a scuttle operation or a collision of the vehicle.

Example 5 includes the apparatus of example 1, wherein the processor circuitry is to determine a position of the UV from the vehicle upon separation from the vehicle to estimate a position of the vehicle.

Example 6 includes the apparatus of example 1, wherein the processor circuitry is to execute the instructions to release the UV from the vehicle via an umbilical cord, the umbilical cord to provide a data interface with the UV.

Example 7 includes the apparatus of example 1, wherein the processor circuitry causes the UV to maneuver autonomously to a predetermined location in response to separation from the vehicle.

Example 8 includes the apparatus of example 1, wherein the processor circuitry is to execute the instructions to release the UV from the vehicle based on sensor data, the UV to track the sensor data.

Example 9 includes an unmanned vehicle (UV) comprising a battery, at least one sensor, and processor circuitry to execute instructions to in response to an occurrence of a reduced operational capability associated with a host vehicle, cause the UV to release from the host vehicle, the host vehicle at least partially submerged in a body of water, and determine a position of the UV based on information from the at least one sensor in response to the UV contacting a surface of the body of the water.

Example 10 includes the UV of example 9, wherein the processor circuitry is to execute the instructions to cause the UV to maneuver to a surface of the body of water via propeller and fins thereof.

Example 11 includes the UV of example 9, wherein the UV is to float to a surface of the body of water upon separation from the host vehicle.

Example 12 includes the UV of example 9, wherein the processor circuitry is to cause a transceiver of the UV to transmit a message indicating the occurrence of the reduced operational capability in response to the UV being at a distance from the host vehicle that is greater than a threshold distance, and receive signals from the host vehicle as the UV moves between the host vehicle and the threshold distance.

Example 13 includes the UV of example 9, wherein the processor circuitry is to cause separation from the host vehicle based on information from the at least one sensor.

Example 14 includes the UV of example 9, wherein the processor circuitry is to execute the instructions to track, via the at least one sensor, a position of the host vehicle subsequent to separation of the UV from the host vehicle.

Example 15 includes the UV of example 9, wherein the UV further includes a data bus interface, the UV to release from the host vehicle via an umbilical cord, the umbilical cord coupled to the data bus interface.

Example 16 includes a method comprising separating, by executing instructions with at least one processor, an unmanned vehicle (UV) from a host vehicle that is at least partially submerged in a body of water based on a determination of an occurrence of a reduced operational capability of the host vehicle, and determining, by executing instructions with the at least one processor, positional information corresponding to the UV based on the UV reaching or departing a surface of the body of the water.

Example 17 includes the method of example 16, wherein separating the UV includes enabling the UV to float or propel itself to the surface.

Example 18 includes the method of example 16, wherein the occurrence is determined based on information from a sensor of the UV, and wherein the separation of the UV from the host vehicle occurs based on the information.

Example 19 includes the method of example 16, further including determining, by executing instructions with the at least one processor, that the UV is separated from the host vehicle by a distance that meets or exceeds a threshold distance or that the UV has reached, transmitting, by executing instructions with the at least one processor, communications including information associated with the host vehicle, and transmitting, by executing instructions with the at least one processor, signals from the host vehicle to the UV when the UV is positioned between the host vehicle and the threshold distance, the signals corresponding to the occurrence of the reduced operational capability.

Example 20 includes the method of example 16, further including transmitting, via an umbilical cord, signals from the host vehicle to the UV when the UV is coupled to the host vehicle. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine readable instructions; and
   processor circuitry to at least one of instantiate or execute the machine readable instructions to:
   determine an occurrence of a reduced operational capability of a vehicle, the vehicle at least partially submerged in a body of water;
   cause an unmanned vehicle (UV) to separate from the vehicle in response to the occurrence of the reduced operational capability;
   determine that the UV has departed from a surface of the body of water;
   monitor a position of the UV in response to the determination that the UV departed the surface;
   determine a distance between the UV and the vehicle based on the position of the UV;
   compare the distance to a threshold distance; and
   when the distance meets or exceeds the threshold distance transmit, via a transmitter of the UV, communications including information associated with the vehicle.

2. The apparatus of claim 1, wherein the UV is releasably couplable to an outer body of the vehicle.

3. The apparatus of claim 1, wherein the reduced operational capability is at least one of a power loss, a scuttle operation or a collision of the vehicle.

4. The apparatus of claim 1, wherein the processor circuitry is to execute the instructions to release the UV from the vehicle via an umbilical cord, the umbilical cord to provide a data interface with the UV.

5. The apparatus of claim 1, wherein the processor circuitry causes the UV to maneuver autonomously to a predetermined location in response to separation from the vehicle, the predetermined location different than the threshold distance.

6. The apparatus of claim 1, wherein the processor circuitry is to execute the instructions to release the UV from the vehicle based on sensor data, the UV to track the sensor data.

7. An unmanned vehicle (UV) comprising:
   a battery;
   at least one sensor; and
   processor circuitry to execute instructions to:
   in response to an occurrence of a reduced operational capability associated with a host vehicle, cause the UV to release from the host vehicle, the host vehicle at least partially submerged in a body of water;
   determine that the UV has departed from a surface of the body of water;
   monitor a position of the UV in response to the determination that the UV has departed the surface of the body of the water;

determine a distance between the UV and the vehicle based on the position of the UV;

compare the distance to a threshold distance; and when the distance meets or exceeds the threshold distance transmit, via a transmitter of the UV, communications including information associated with the vehicle.

8. The UV of claim 7, wherein the processor circuitry is to execute the instructions to cause the UV to maneuver to a surface of the body of water via a propeller and fins thereof.

9. The UV of claim 7, wherein the UV is to float to a surface of the body of water upon separation from the host vehicle.

10. The UV of claim 7, wherein the processor circuitry is to execute the instructions to cause a transceiver of the UV to receive signals from the host vehicle as the UV moves between the host vehicle and the threshold distance.

11. The UV of claim 7, wherein the processor circuitry is to execute the instructions to cause separation of the UV from the host vehicle based on information from the at least one sensor.

12. The UV of claim 7, wherein the processor circuitry is to execute the instructions to track, via the at least one sensor, the position of the host vehicle subsequent to separation of the UV from the host vehicle.

13. The UV of claim 7, wherein the UV further includes a data bus interface, the UV to release from the host vehicle via an umbilical cord, the umbilical cord coupled to the data bus interface.

14. A method comprising:

separating, by executing instructions with at least one processor, an unmanned vehicle (UV) from a host vehicle that is at least partially submerged in a body of water based on a determination of an occurrence of a reduced operational capability of the host vehicle;

determining, by executing instructions with the at least one processer, that the UV has departed from a surface of the body of water;

monitoring a position of the UV in response to the determination that the UV has departed the surface;

determining a distance between the UV and the vehicle based on the position of the UV;

comparing the distance to a threshold distance; and when the distance meets or exceeds the threshold distance transmitting, via a transmitter of the UV, communications including information associated with the vehicle.

15. The method of claim 14, wherein separating the UV includes enabling the UV to float or propel itself to the surface.

16. The method of claim 14, wherein the occurrence is determined based on information from a sensor of the UV, and wherein the separation of the UV from the host vehicle occurs based on the information.

17. The method of claim 14, further including transmitting, by executing instructions with the at least one processor, signals from the host vehicle to the UV when the UV is positioned between the host vehicle and the threshold distance, the signals corresponding to the occurrence of the reduced operational capability.

18. The method of claim 14, further including transmitting, via an umbilical cord, signals from the host vehicle to the UV when the UV is coupled to the host vehicle.

19. The apparatus of claim 1, wherein the processor circuitry is to execute the instructions to determine that the UV has departed from the surface based on an activation of an air propulsion system associated with the UV.

20. The apparatus of claim 1, wherein the processor circuitry is to execute the instructions to determine that the UV has departed from the surface based on the distance between the UV and the vehicle.

21. The apparatus of claim 1, wherein the processor circuitry is to execute the instructions to cause the UV to utilize positional information signals that are received by a receiver of the UV in response to the determination that the UV has departed from the surface.

22. The apparatus of claim 5, wherein the processor circuitry causes the UV to maneuver to the predetermined location subsequent to transmitting the communications.

23. The apparatus of claim 5, wherein the processor circuitry causes the UV to maneuver to the predetermined location while transmitting the communications.

* * * * *